2,888,364
Patented May 26, 1959

2,888,364
PERFLUOROCHLOROOLEFIN POLYMER BLENDS

William H. Bauer, Jr., Bloomfield, N.J., assignor, by mesne assignments, to Minnesota Mining and Manufacturing Company, St. Paul, Minn., a corporation of Delaware No Drawing. Application September 14, 1956
Serial No. 609,814

26 Claims. (Cl. 117—72)

This invention relates to resinous compositions comprising mixtures of perfluorochloroolefin polymers and thermosetting resins. In one of its aspects this invention relates to perfluorochloroolefin polymer compositions which have improved adhesion characteristics.

There is a widespread need in industry for protective coatings which will withstand the effects of severe environmental conditions. Many protective coatings are available today but these are useful only where high temperature and highly corrosive materials are not encountered.

Recent industrial developments have made available the high molecular weight perfluorochloroolefin polymers. These perfluorochloroolefin polymers, for example polymers of trifluorochloroethylene, have a unique combination of physical and chemical characteristics which has led to their use in a variety of applications. Physically, these polymers possess high thermal stability and excellent electrical properties and are, therefore, widely used as electrical insulation particularly in situations where high temperatures are expected. Chemically, these polymers offer excellent resistance to highly corrosive chemicals, such as fuming nitric acid, solvents such as aniline, etc., and are therefore widely used where corrosive environmental conditions are anticipated. Although the perfluorochloroolefin polymers as a group possess desirable physical and chemical characteristics, they suffer from the disadvantage that their adhesive characteristics are poor. Hence, their use as protective coatings has been seriously limited.

It is an object of this invention to provide resinous compositions which combine good physical and chemical characteristics with good adhesive properties.

It is another object of this invention to provide additives which improve the adhesion of perfluorochloroolefin polymers to various substrates.

It is another object of this invention to provide chemically resistant and thermally stable protective coating compositions.

It is another object of this invention to provide protective coatings for metal surfaces.

Various other objects and advantages of the present invention will become apparent to those skilled in the art on reading the accompanying description and disclosure.

Generally, the above objects are accomplished by the use of the compositions of this invention which comprise mixtures of the perfluorochloroolefin polymers with phenolic compounds and which include, where exceptionally high adhesion is required, the epoxide resins.

The perfluorochloroolefin polymers to which this invention is applicable, are prepared by homopolymerization of monomers, such as trifluorochloroethylene, difluorodichloroethylene (symmetrical and unsymmetrical), trichlorofluoroethylene, etc., and copolymers of the above-described perfluorochloroolefins which are prepared by copolymerization with other halogenated olefins, such as vinylidene fluoride, vinyl fluoride, vinylidene chloride and vinyl chloride. These polymers, i.e., copolymers and homopolymers are to be distinguished from the low molecular weight polymers of the same monomers which exist in the oil, grease and wax range. Thus, these polymers are normally solid, have softening points above about 150° C. and, in the case of homopolymers of trifluorochloroethylene, have no strength temperature (N.S.T.) of at least 220° C. and preferably above 250° C. For purposes of this invention, the preferred homopolymer is the homopolymer of trifluorochloroethylene and the preferred copolymer is the copolymer of trifluorochloroethylene copolymerized with vinylidene fluoride. Copolymers containing above 90 and below 100 mole percent of trifluorochloroethylene copolymerized with vinylidene fluoride, possess substantially the same characteristics as the homopolymer, but are superior with respect to heat embrittlement characteristics and somewhat inferior with respect to chemical resistance. Copolymers containing between 70 and 80 mole percent of trifluorochloroethylene copolymerized with vinylidene fluoride have resinous characteristics and are soluble in a number of common organic solvents. Copolymers containing between 20 and 69 mole percent of trifluorochloroethylene copolymerized with vinylidene fluoride are elastomeric. The preferred perfluorochloroolefin polymer is the homopolymer of trifluorochloroethylene. However, depending upon the ultimate properties of the blend, the copolymers previously described can be substituted for the homopolymers. In addition, mixtures of the homopolymer with various other copolymers can also be employed as will become evident hereinbelow. The term "polymer" includes homopolymers and copolymers.

The phenolic compounds which are employed in the compositions of this invention, are the alkylol phenols and preferably the etherified alkylol phenols. These alkylol phenols have the general formula:

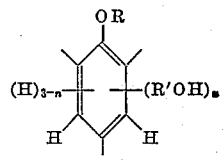

in which R represents aliphatic, cycloaliphatic and aryl substituted aliphatic groups, and R′ is an alkylene radical preferably containing not more than 6 carbon atoms and n is an integer between 1 and 3. Among the organic groups which R, in the above formula, may represent are, for instance, alkyl groups, e.g., methyl, ethyl propyl, isopropyl, butyl, etc.; unsaturated aliphatic, e.g., vinyl, allyl, methallyl, cyclopentenyl, etc.; aralkyl, for instance, benzyl, etc.; styryl, etc.; and the halogenated derivatives of the aforementioned aliphatic groups, for example the aforementioned groups containing chlorine, bromine, fluorine, etc. A particularly suitable class of phenolic compounds are the methylol phenols preferably the trimethylol phenols such as the allyl ether of trimethylol phenol.

The epoxide resins which are used in the compositions of this invention, are prepared by the condensation of epoxy compounds, such as epichlorohydrin and glycerol dichlorohydrin with polyhydric organic compounds in the presence of sodium hydroxide to split off HCl or NaCl. Among the polyhydric compounds which can be used, are alcohols, such as mannitol, sorbitol, erythritol, pentaerythritol, and polyallyl alcohol; dihydric alcohols, trihydric alcohols, such as glycerol or trimethylol propane; dihydric phenols, such as Bisphenol A (p,p′-dihydroxy diphenyl dimethyl methane) and trihydric phenols. Because of their greater bond strength, high chemical resistance, better physical properties and availability, epoxide resins prepared by the condensation of Bisphenol A and epichlorohydrin are preferred in the preparation of the compositions of this invention. In their original form, the epoxide resins are relatively low molecular weight compounds ranging from liquids to rather high melting solids depending on the degree of condensation. Thus, these epoxide resins range in properties from light mobile liquids melting at about 0° C. and having a viscosity from C to F on the Gardner-Holt scale, up to high melting solids having a melting point of about 160–170° C. and a viscosity, as a 40 percent solution in butyl carbitol, of about $Z_1$–$Z_5$ on the Gardner-Holt scale. The degree of condensation of the epoxy resin can be defined by reference to the "epoxy value" which is defined as the equivalent of epoxy groups per 100 grams of resin. The resins used in this invention should have an epoxy value between about 0.02 and about 0.53. Another and more frequently used expression for indicating the degree of condensation of the resin is "epoxy equivalent" which is defined as the weight of resin in grams containing one gram equivalent of epoxy groups. Here, the higher the equivalent the higher the degree of condensation of the resin. Under this definition the resins of this invention should have an epoxy equivalent of at least 190 and should not exceed about 4,000. The preferred epoxide resins have an epoxy equivalent between about 450 and about 1025. The epoxide resins are commercially available as Epon and Araldite, etc.

As indicated previously, the epoxide resins are available as liquids or solids. In preparing the compositions of this invention, either the liquid or solid epoxide resins can be employed. When blended with the perfluorochloroolefin polymer, and the phenolic compound, the liquid epoxide resins form slurries or pastes. The use of the liquid epoxides is therefore indicated where solvent free systems are to be employed, e.g., caulking compounds, putties, etc. However, since most application techniques require the presence of a volatile vehicle and since the use of the solid epoxide resins results in the production of superior end items, the use of the solid epoxides is preferred. When the solid epoxide resins are employed, they are used in the form of solutions in suitable solvents in which the perfluorochloroolefin polymer is present in the form of a dispersion.

In preparing the compositions of this invention, between about 5 and about 100 parts of the phenolic compound, preferably between about 15 and about 50 parts, are admixed with 100 parts of the perfluorochloroolefin polymer. The perfluorochloroolefin polymer should, of course, be in the form of a finely-divided powder, i.e. at least 95 percent through a No. 7 sieve, preferably a No. 12 sieve in the U.S. standard series. The exact proportion of the phenolic compound is based on the use for which the composition is intended. Where maximum chemical resistance is required, the phenolic compound constitutes a minor proportion of the composition, whereas where maximum bond strength is required the phenolic compound constitutes a major proportion of the composition. The phenolic compound, in admixture with the perfluorochloroolefin polymer, is converted from a substantially monomeric material to a relatively high molecular weight insoluble polymer by heating at elevated temperatures for prolonged periods of time. Where a temperature-time cure is effected, the blend or admixture is heated at a minimum of about 460° F. for a period of time up to about 1½ hours. At elevated temperatures, the time necessary to effect the curing is substantially reduced. Thus, it is usually preferred to heat the blend at a temperature between about 480° F. and about 500° F. for a period of time between about ½ and about 1 hour. As indicated previously, epoxide resins can be employed in blends of this invention, particularly where maximum bond strength is desired. When an epoxide resin is employed, it cross-links or otherwise reacts with the phenolic compound so as to produce a hard infusible reaction product. Therefore, when an epoxide resin is present, the phenolic compound, in addition to contributing to the adhesiveness of the blend, serves as a cross-linking agent for the epoxide resin. When added to the blend, the epoxide resin constitutes between about 20 and about 200 parts for each 100 parts of the perfluorochloroolefin polymer and preferably between about 30 and about 70 parts. Where the term "parts" appears in the specification and claims, it is to be understood that the parts are by weight.

As indicated previously, the blends of this invention are usually applied by techniques which require the presence of a volatile vehicle in which the perfluorochloroolefin polymer is insoluble and in which the phenolic compound and, when used, the epoxide resin is preferably soluble. Suitable volatile vehicles are aromatic and aliphatic ketones, aromatic hydrocarbons and alcohols. Because the phenolic compound and the epoxide resin are soluble in ketones, it is preferred to use a ketone either singly or in combination with other vehicles. Since the drying rate of vehicle is of considerable importance in most application techniques, it is preferred to use a balanced solvent system. Such a system comprises 100 parts of an aromatic hydrocarbon, 35 to 95 parts of at least one ketone and 15 to 30 parts of an alcohol. Typical aromatic hydrocarbons include benzene, toluene, xylene, etc. and mixtures thereof; typical ketones include methyl ethyl ketone, methyl-isobutyl ketone, di-isobutyl ketone, isophorone, and cyclohexanone. Typical alcohols include isobutanol, n-butanol, pentanol-1, and 2-methylbutanol-4. A balanced volatile vehicle which is of particular applicability to most application techniques, comprises 15 to 35 parts of di-isobutyl ketone, 40 to 60 parts of methyl ethyl ketone, and 15 to 30 parts of an alcohol such as isobutanol for each 100 parts of xylene. Where a volatile vehicle is employed, the non-volatile or solids phase constitutes between about 1 and about 50 weight percent of the composition with volatile vehicle constituting the remainder. The term "non-volatile" and "solid" are intended to define the material which remains after the volatile vehicle has been removed although it is recognized that some of the constituents may be somewhat volatile and other of the constituents may be liquid in their original form, e.g., the phenolic compound.

In addition to the above-described non-volatile constituents, the blends of this invention can contain various additives which are included to alter or improve various physical characteristics. Thus, where comparatively flexible coatings are desirable, plasticizers can be added. Suitable plasticizers include the low molecular weight perfluorochloroolefin polymers such as the polymers and preferably the telomers of trifluorochloroethylene and the normally solid copolymers of perfluorochloroolefins such as trifluorochloroethylene copolymerized with other halogenated olefins such as vinylidene fluoride. The low molecular weight homopolymer of trifluorochloroethylene ranges from relatively mobile liquids to hard brittle resins. The preferred low molecular weight polymer of trifluorochloroethylene is the homotelomer which has the general formula $Cl(CF_2CFCl)_nCl$ in which $n$ varies from about 4 to about 20. These low molecular weight telomers are best characterized by their boiling points which range from 95° C. to 270° C. at 0.5 mm. of mercury. The preferred low molecular weight telomer is a blend of relatively high boiling products which has a melting point (ball and ring) between 110° F. and 230° F. and preferably between 140° F. and 160° F. The preparation of these polymers is described in copending application Serial No. 294,495 of W. S. Barnhart, filed June 19, 1952, now U.S. Patent 2,770,659. The normally solid copolymers which are used as plasticizers, are those copolymers which contain between about 20 and about 80 mole percent of a perfluorochloroolefin such as trifluorochloroethylene copolymerized with another halogenated olefin, such as vinylidene fluoride. Copolymers containing between about 69 and about 80 mole percent of the perfluorochloroolefin are resinous. The preferred copolymeric plasticizer is the elastomeric copolymer which contains between about 20 and about 69 mole percent of trifluorochloroethylene copolymerized with vinylidene fluoride.

The preparation of the resinous copolymers is described in U.S. Patent No. 2,752,332 and the preparation of the elastomeric copolymer is described in U.S. Patent No. 2,752,331. The above described plasticizers are soluble in ketones and esters. Hence, when a volatile vehicle containing either a ketone or ester is employed, these plasticizers will be in solution. When used, these plasticizers are added in an amount between about 1 and about 25 parts per 100 parts of perfluorochloroolefin polymer.

Additives which stabilize the perfluorochloroolefin polymer against the effects of thermal degradation can also be included in the blends of this invention. Such additives include, barium peroxide, lead dioxide, chromic oxide, chromic sulfide, cadmium oxide, cadmium sulfide, mercuric oxide, mercuric sulfide, cobaltic oxide, cobaltic sulfide, zinc oxide, zinc sulfide, stannic oxide and stannic sulfide. When added, the stabilizer constitutes between about 0.1 and about 5 parts per 100 parts of perfluorochloroolefin polymer. Inert fillers and colored pigments can also be added to the blends in which case, they constitute from 0.1 to 20 parts per 100 parts of the perfluorochloroolefin polymer.

In some instances, difficulty may be experienced in bonding the blends of this invention to metallic surfaces. This is particularly true where the blends are to be applied to metal surfaces which have been treated with rust-preventatives. In such instances, it is desirable that a small quantity of phosphoric acid (ortho) be added to the blend. When phosphoric acid is used, it constitutes between about 0.1 and about 3 parts per 100 parts of perfluorochloroolefin polymer.

The blends of this invention, using a volatile vehicle, can be applied using spray, dip, knife, and flow coating techniques. When the blend is applied to the desired substrate by any of the above techniques, it is then fused into a continuous adherent film by heating at a temperature above the first order transition temperature of the perfluorochloroolefin polymer and below the decomposition temperature of the components of the blend.

Because of their good physical and chemical characteristics, the blends of this invention have utility as coatings in a variety of applications. For example, the blends of this invention have good release properties and can therefore be employed as mold release agents. Also where moderately adverse environmental conditions prevail, the blends of this invention can be utilized as protective coatings. However, where severe environmental conditions, e.g., extreme corrosive chemicals, high temperatures, etc. are anticipated, it is preferred that a perfluorochloroolefin polymer coating be applied over the blend which, in this instance, functions as a primer coating. The perfluorochloroolefin polymer coating can be applied by a variety of techniques, such as by spraying, dipping and brushing techniques. A particularly suitable perfluorochloroolefin polymer dispersion comprises between about 10 and about 40 weight percent of a homopolymer of trifluorochloroethylene (N.S.T. 300) dispersed in an 80/20 admixture of xylene and di-isobutyl ketone.

Where blends of this invention are used as primer coatings, they are applied to the substrate by the previously described techniques and are then fused into a continuous adherent film by baking. Where maximum bond strength is desired, an intermediate mixed coat is applied over the prime coat. In applying the mixed coat, a coating of primer composition and of perfluorochloroolefin polymer dispersion is successively applied with partial air-drying between each coat. This mixed coat is then fused by baking. The perfluorochloroolefin polymer dispersion is then applied over the mixed coat and fused by baking. Baking temperature, as indicated previously, is maintained above the first order transition temperature of the perfluorochloroolefin polymer and below the decomposition temperature of the materials. Usually, the baking temperature will be maintained between about 420° F. and about 520° F. and preferably between about 470° F. and 490° F. The primer coat and when used the mixed coat are each baked at the previously described temperature for a period of time between about 15 minutes and about 2 hours and preferably between about 30 minutes and 1 hour. After the application of the perfluorochloroolefin polymer dispersion the coating is baked so as to bring the total baking time between about 8 hours and about 24 hours. When baked within the preferred temperature range, the total baking time is between about 12 and about 20 hours. For maximum adhesion, the primer coat should be at least 2 mils in thickness and the primer thickness of the mixed coat should be at least 1 mil to provide adequate bonding to the substrate. The combined thickness of the primer coat in the primer coat and mixed coat should preferably not exceed about 5 mils since otherwise the mechanical strength of the bond will be reduced and there will be a tendency to "mud-crack." The outer coating of the perfluorochloroolefin polymer should be maintained between about 5 and about 20 mils and preferably for optimum corrosion resistance between about 9 and about 12 mils.

The following examples are offered for purposes of illustration and are not to be construed as unnecessarily limiting. In each of the examples the formulation described therein was applied to degreased and grit-blasted steel panels. An intermediate mixed coat was then applied followed by a final coating of a homopolymer of trifluorochloroethylene (N.S.T. 300) plasticized with 25 weight per cent based on homopolymer of low molecular weight telomeric plasticizer which was applied from a dispersion in an 80/20 mixture of xylene and di-isobutyl ketone (40 percent solids). Detailed information on the application of the various coatings is given in Example I. Substantially identical techniques were used in each of the examples.

*Example I*

The following blend was prepared:

|  | Parts | Grams |
|---|---|---|
| Non-Volatile (36 Weight Percent): |  |  |
| Homopolymer of Trifluorochloroethylene (N.S.T. 300) | 100 | 114.8 |
| Telomeric Plasticizer (Melting Point 140°–160° C.) (ASTM–E–28) | 33.3 | 38.2 |
| Allylated Trimethylol phenol | 42.0 | 48.2 |
| Volatile (64 Weight Percent): |  |  |
| Xylene | 100 | 183.6 |
| Di-isobutyl ketone | 25 | 45.9 |
| Isobutanol | 71.6 | 131.7 |

Two double passes of the above-described blend were applied by spraying to steel panels with partial air-drying. The panels were baked at 480° F. (metal temperature) for 30 minutes after each coat. A mixed coat was then applied by coating (three single passes) with the above-described blend and followed by coating (three single passes) with a dispersion of a homopolymer of trifluorochloroethylene in an 80/20 xylene-di-isobutyl ketone dispersant without baking. This mixed coat was then baked for 30 minutes at 480° F. after which a dispersion of a homopolymer of trifluorochloroethylene (40 percent solids) in 80/20 xylene-di-isobutyl ketone was applied until a total film thickness of 13–14 mils was obtained. The panel was then baked at 480° F. so as to bring the total baking time up to 18 hours after which the panel was quenched by immersion in water. These panels were subjected to steaming at 240° F. for 10 hours followed by exposure to refluxing methyl ethyl ketone for 24 hours without significant loss of adhesion.

*Example II*

This example illustrates the preparation of a coating composition in which an epoxide resin was employed. The epoxide resin was the condensation product of epichlorohydrin and Bisphenol A which has an epoxy value of 0.19–0.20, a specific gravity of 1.2041 and a melting point (Duran's mercury method) of 64–67° F.

The following composition was prepared:

|  | Parts | Grams |
|---|---|---|
| Non-Volatile (40 Weight Percent): | | |
| Homopolymer of trifluorochloroethylene (N.S.T. 300) | 100 | 117.6 |
| Telomeric Plasticizer (Melting Point 140–160° F.) (ASTM-E-28) | 33.3 | 39.2 |
| Allylated Trimethylol Phenol | 26.7 | 31.4 |
| Epoxide Resin | 53.4 | 62.7 |
| Volatile Vehicle (60 weight Percent): | | |
| Xylene | 100 | 188.2 |
| Di-isobutyl Ketone | 25 | 47.0 |
| Methyl ethyl Ketone | 50 | 94.1 |
| Isobutanol | 25 | 47.0 |

The above formulation was prepared by admixing 25 parts by weight (156.8 grams) of a homopolymer of trifluorochloroethylene containing telomeric plasticizer dispersed in an 80/20 mixture of xylene and di-isobutyl ketone with 5 parts weight of a 40 percent solution of allylated trimethylol phenol in isobutanol and 10 parts by weight of a 40 percent solution of the epoxide resin in methyl ethyl ketone. These ingredients were mixed in the order given since otherwise there would be a tendency for the xylene to throw the epoxide resin out of solution. Steel panels were spray coated with this formulation as described in Example I. The adhesion after 284 hours steaming at 240° F. was excellent. Impact resistance, as measured by 50″ pounds impact on a ⅞″ steel ball, neither ruptured nor delaminated the coating. There was no cold flow under these condtions.

*Example III*

The following formulation was prepared as described in Example II. The same epoxide resin was used.

|  | Parts | Grams |
|---|---|---|
| Non-Volatile (40 Weight Percent): | | |
| Homopolymer of trifluorochloroethylene (N.S.T. 300) | 100 | 160.0 |
| Allylated Trimethylol Phenol | 20 | 32.0 |
| Epoxide Resin | 40 | 64.0 |
| Volatile Vehicle (60 Weight Percent): | | |
| Xylene | 100 | 192.0 |
| Di-isobutyl ketone | 25 | 48.0 |
| Methyl ethyl ketone | 50 | 96.0 |
| Isobutanol | 25 | 48.0 |

This formulation, when applied to steel panels as described in Example I, showed excellent adhesion after 8 months steaming at 240° F. The impact resistance, as measured by 50″ pounds impact by ⅞″ steel ball, was excellent. The coating did not rupture, cold flow nor delaminate.

*Example IV*

The following formulation was prepared using the procedure described in Example II. The ingredients were the same except for the addition of phosphoric acid.

|  | Parts | Grams |
|---|---|---|
| Non-Volatile (40 Weight Percent): | | |
| Homopolymer of trifluorochloroethylene (N.S.T. 300) | 100 | 160.0 |
| Allylated Trimethylol Phenol | 20 | 32.0 |
| Epoxide Resin | 40 | 64.0 |
| Phosphoric Acid, 85% | 1 | 2.6 |
| Volatile Vehicle (60 Weight Percent): | | |
| Xylene | 100 | 192.0 |
| Di-isobutyl ketone | 25 | 48.0 |
| Methyl ethyl ketone | 50 | 96.0 |
| Isobutanol | 25 | 48.0 |

This composition was applied to steel panels as described in Example II. The adhesion after 7½ months steaming at 240° F. was excellent. The impact resistance of the film, as measured at 50″ pounds on a ⅞″ ball, was as described in Example III.

*Example V*

The formulation was prepared as described in Example II. All ingredients were the same as used in the previous examples except for the expoxide resin which was a condensation product of epichlorohydrin and Bisphenol A whose epoxy value is 0.52, specific gravity is 1.1676 and melting point is 90° C.

|  | Parts | Grams |
|---|---|---|
| Non-Volatile (40 Weight Percent): | | |
| Homopolymer of Trifluorochloroethylene (N.S.T. 300) | 100 | 160.0 |
| Allylated trimethylol phenol | 20 | 32.0 |
| Epoxide Resin | 40 | 64.0 |
| Volatile Vehicle (60 Weight Percent): | | |
| Xylene | 100 | 192.0 |
| Di-isobutyl ketone | 25 | 48.0 |
| Methyl ethyl ketone | 50 | 96.0 |
| Isobutanol | 25 | 48.0 |

The above formulation was applied to steel panels as described in Example I. The adhesion after 5 months of steaming at 240° F. was excellent. The impact resistance of the film as measured at 50″ pounds on a ⅞″ ball was excellent. The film did not rupture, cold flow nor delaminate.

*Example VI*

The formulation of the preceding example was prepared using different grades of epoxide resins. The epoxide resins were the condensation product of epichlorohydrin and Bisphenol A except that the epoxy values (degree of condensation) were different. Steel panels were coated as described in Example II. The following table, which gives the epoxy value and the melting point of the epoxide resin, indicates the character of the coatings produced when tested using the same techniques as were used in the preceding examples.

| Epoxide Resin | | Adhesion After 284 Hours Steaming at 240° F. | Impact Resistance (50″ pounds on ⅞″ Ball) |
|---|---|---|---|
| Melting Point, ° C. | Epoxy Value | | |
| 97–103 | 0.11–0.12 | Good—broke after 3 months. | no effect. |
| 127–133 | 0.05 | Excellent—broke after 4 months. | Some cold flow. |
| 145–155 | 0.03 | do | Do. |

*Example VII*

This example illustrates a coating composition which is particularly suited to application by dip, knife and flow coating techniques. The following composition was prepared in which the homopolymer of trifluorochloroethylene, the epoxide resin and the allylated trimethylol phenol were the same as was used in Example II. The elastomeric copolymer was a copolymer of trifluorochloroethylene and vinylidene fluoride (50/50 mole ratio).

|  | Parts | Grams |
|---|---|---|
| Non-Volatile (40 Weight Percent): | | |
| Homopolymer of trifluorochloroethylene (N.S.T. 300) | 100 | 152.0 |
| Allylated Trimethylol phenol | 21.1 | 32.0 |
| Epoxide Resin | 42.2 | 64.0 |
| Elastomeric Copolymer | 5.3 | 8.0 |
| Volatile Vehicle (60 Weight Percent): | | |
| Amyl Acetate | 100 | 240.0 |
| Methyl ethyl ketone | 40 | 96.0 |
| Isobutanol | 20 | 48.0 |

This formulation was prepared by admixing 25 parts by weight of a dispersion of 40 percent of a homopolymer of trifluorochloroethylene and elastomeric copolymer in amyl acetate dispersant with 5 parts by weight of a 40 percent solution of allylated trimethylol phenol in isobutanol and 10 parts by weight of a 40 percent solution of epoxide resin in methyl ethyl ketone. When applied to steel panels, as described in Example I except that dip and flow techniques were used instead of spraying, the coatings showed the same adhesion properties as shown by the formulation of Example III.

Example VIII

This example illustrates a coating composition which, like the composition of Example VII is particularly suited to application by dip, knife and flow coating techniques. The non-volatile components were the same as used in Example VII except for the epoxide resin which was omitted from the composition of this example.

| | Parts | Grams |
|---|---|---|
| Non-Volatile (36 Weight Percent): | | |
| Homopolymer of Trifluorochloroethylene (N.S.T. 300) | 100 | 114.0 |
| Allylated Trimethylol Phenol | 35.0 | 40.0 |
| Elastomeric Copolymer | 5.2 | 6.0 |
| Volatile Vehicle (64 Weight Percent): | | |
| Amyl Acetate | 100 | 180.0 |
| Isobutanol | 55.5 | 100.0 |

When applied, as described in Example I except by dip technique instead of spraying, to steel panels, the adhesion and impact resistance was good.

Example IX

Coated panels, prepared as described in Example II, were adjusted so as to enclose a modified Battelle cell which was connected to an Allihn type condenser. One of the panels had been scored through to the metal so that the scored portion was exposed at the liquid-vapor interface in a 50 percent solution of sodium hydroxide. The cell was then immersed in a 180° F. constant temperature bath for a period of one month. At the end of this test period, the panels were removed. Although the metal was corroded in the scored portion, the adjacent coated portions were unaffected and there was no evidence of "creep" corrosion. The unscored panel remained unaffected. This experiment was repeated, with substantially identical results, using 10 percent hydrochloric acid, 37 percent hydrochloric acid, 10 percent sulfuric acid, 98 percent sulfuric acid, 10 percent nitric acid, 70 percent nitric acid and Lever Bros. detergent intermediates which are available as Onyxol, Alipal and Sulfonic acid.

Example X

A coated panel, prepared as described in Examples III and IV was placed in a steam bath maintained at 240° F. There was no significant loss of adhesion after 8 months.

Example XI

This example is presented to illustrate the excellent physical characteristics of the blends of this invention. A dispersion of a homopolymer of tirfluorochloroethylene was applied directly to steel panels to produce a 12 mil coating. The coating was baked at 480° F. for 18 hours and quenched after which the adhesion and impact resistance was measured. The coating delaminated after steaming for ½ hour at 230° F. 50″ pounds forward impact on a ⅞″ steel ball resulted in rupture and cold flow of the coating.

In addition to their utility as protective coatings for steel, the blends of this invention can be applied to other metal surfaces such as aluminum, magnesium, zinc, cadmium, Inconel, Monel or in general to any metal surface other than untreated copper or alloys of copper which contain above 75 percent copper since copper promotes degradation of the perfluorochloroolefin polymer and thereby interferes with adhesion. The blends of this invention can be applied to those non-metallic surfaces which can withstand the required baking temperatures such as Fiberglas, asbestos, porcelain, etc.

Various modifications and alterations of the process of this invention will become apparent to those skilled in the art and may be used without departing from the scope of this invention.

Having thus described my invention, I claim:

1. A novel composition which comprises an admixture of 100 parts of a normally solid perfluorochloroolefin polymer having a softening point above about 150° C. and between about 5 and about 100 parts of an alkylol phenol.

2. A novel composition which comprises an admixture of 100 parts of a normally solid polymer of trifluorochloroethylene having a softening point above about 150° C. and between about 5 and about 100 parts of a methylol phenol.

3. A novel composition which comprises an admixture of 100 parts of a normally solid homopolymer of trifluorochloroethylene having a no strength temperature of at least 220° C., between about 1 and about 25 parts of an elastomeric copolymer containing between about 20 and about 69 mole percent of trifluorochloroethylene copolymerized with vinylidene fluoride and between about 5 and about 100 parts of a trimethylol phenol.

4. A novel composition which comprises an admixture of 100 parts of a normally solid homopolymer of trifluorochloroethylene having a no strength temperature of at least 220° C., between about 1 and about 25 parts of a low molecular weight telomer of trifluorochloroethylene having a boiling point between about 95° C. and about 270° C. at 0.5 mm. of mercury, and between about 5 and about 100 parts of a trimethylol phenol.

5. A novel composition consisting essentially of an admixture of 100 parts of a normally solid homopolymer of trifluorochloroethylene having a no strength temperature of at least 220° C., between about 1 and about 25 parts of an elastomeric copolymer containing between about 20 and about 69 mole percent of trifluorochloroethylene copolymerized with vinylidene fluoride and between about 5 and about 100 parts of the allylated ether of trimethylol phenol.

6. A novel composition consisting essentially of an admixture of 100 parts of a normally solid homopolymer of trifluorochloroethylene having a no strength temperature of at least 220° C., between about 1 and about 25 parts of a low molecular weight telomer of trifluorochloroethylene having a boiling point between about 95° C. and about 270° C. at 0.5 mm. of mercury, and between about 5 and about 100 parts of the allylated ether of trimethylol phenol.

7. A novel composition which comprises an admixture of a normally solid perfluorochloroolefin polymer having a softening point above about 150° C., an alkylol phenol, and the condensation product of epichlorohydrin and a polyhydric organic compound, said condensation product having an epoxy equivalent between about 190 and about 4,000.

8. A novel composition which comprises an admixture of 100 parts of a normally solid polymer of trifluorochloroethylene having a softening point above about 150° C., between about 5 and about 100 parts of a trimethylol phenol and between about 20 and about 200 parts of the condensation product of epichlorohydrin and a polyhydric organic compound, said condensation product having an epoxy equivalent between about 190 and about 4,000.

9. A novel composition which comprises an admixture of 100 parts of a normally solid homopolymer of trifluorochloroethylene having a no strength temperature of at least 220° C., between about 5 and about 100 parts of the allylated ether of trimethylol phenol and between about 20 and about 200 parts of the condensation product of epichlorohydrin and p,p'-dihydroxy diphenyl dimethyl methane, said condensation product having an epoxy equivalent between about 190 and about 4,000.

10. A novel composition which comprises an admixture of 100 parts of a normally solid homopolymer of trifluorochloroethylene having a no strength temperature of at least 220° C., between about 5 and about 100 parts of the allylated ether of trimethylol phenol and between about 20 and about 200 parts of the condensation product of epichlorohydrin and p,p'-dihydroxy diphenyl dimethyl methane, said condensation product having an epoxy equivalent between about 190 and about 4,000 and between about 0.1 and about 3 parts of phosphoric acid.

11. A novel composition consisting essentially of an admixture of 100 parts of a normally solid homopolymer of trifluorochloroethylene having a no strength temperature of at least 220° C., between about 5 and about 100 parts of the allylated ether of trimethylol phenol and between about 20 and about 200 parts of the condensation product of epichlorohydrin and p,p'-dihydroxy diphenyl dimethyl methane, said condensation product having an epoxy equivalent between about 190 and about 4,000.

12. A novel composition consisting essentially of an admixture of 100 parts of a normally solid homopolymer of trifluorochloroethylene having a no strength temperature of at least 220° C., between about 5 and about 100 parts of the allylated ether of trimethylol phenol, between about 20 and about 200 parts of the condensation product of epichlorohydrin and p,p'-dihydroxy diphenyl dimethyl methane, said condensation product having an epoxy equivalent between about 190 and about 4,000 and between about 0.1 and about 3 parts of phosphoric acid.

13. A novel composition which comprises an admixture of a non-volatile phase comprising an admixture of 100 parts of a normally solid perfluorochloroolefin polymer having a softening point above about 150° C. and between about 5 and about 100 parts of an alkylol phenol and as a volatile vehicle at least one compound selected from the group consisting of alcohols, aromatic and aliphatic ketones and aromatic hydrocarbons.

14. A novel composition which comprises an admixture of between about 1 and about 50 weight percent of a non-volatile phase comprising an admixture of 100 parts of a normally solid polymer of trifluorochloroethylene having a softening point above about 150° C., between about 5 and about 100 parts of a methylol phenol and between about 20 and about 200 parts of the condensation product of epichlorohydrin and p,p'-dihydroxy diphenyl dimethyl methane, said condensation product having an epoxy equivalent between about 190 and about 4,000 and as the volatile vehicle between about 1 and about 50 weight percent of at least one compound selected from the group consisting of alcohols, aromatic and aliphatic ketones and aromatic hydrocarbons.

15. A novel composition which comprises an admixture of between about 1 and about 50 weight percent of a non-volatile phase comprising an admixture of 100 parts of a normally solid homopolymer of trifluorochloroethylene having a no strength temperature of at least 220° C., between about 5 and about 100 parts of the allylated ether of trimethylol phenol and between about 20 and about 200 parts of the condensation product of epichlorohydrin and p,p'-dihydroxy diphenyl dimethyl methane, said condensation product having an epoxy equivalent between about 190 and about 4,000 and as the volatile vehicle between about 1 and about 50 weight percent of an admixture comprising 100 parts of an aromatic hydrocarbon, 35-95 parts of a ketone and 15-30 parts of an alcohol.

16. A novel composition consisting essentially of between about 1 and about 50 weight percent of a non-volatile phase consisting essentially of an admixture of 100 parts of a normally solid homopolymer of trifluorochloroethylene having a no strength temperature of at least 220° C., between about 5 and about 100 parts of the allylated ether of trimethylol phenol, between about 20 and about 200 parts of the condensation product of epichlorohydrin and p,p'-dihydroxy diphenyl dimethyl methane, said condensation product having an epoxy equivalent between about 190 and about 4,000 and between about 1 and about 50 weight percent of a volatile vehicle consisting essentially of 100 parts of xylene, between about 15 and about 35 parts of di-isobutyl ketone, between about 40 and about 60 parts of methyl ethyl ketone and between about 15 and about 30 parts if isobutanol.

17. A novel composition consisting essentially of between about 1 and about 50 weight percent of a non-volatile phase consisting essentially of an admixture of 100 parts of a normally solid homopolymer of trifluorochloroethylene having a no strength temperature of at least 220° C., between about 5 and about 100 parts of the allylated ether of trimethylol phenol, between about 20 and about 200 parts of the condensation product of epichlorohydrin and p,p'-dihydroxy diphenyl dimethyl methane, said condensation product having an epoxy equivalent between about 190 and about 4,000 and between about 0.1 and about 3 parts of phosphoric acid, and between about 1 and about 50 weight percent of a volatile vehicle consisting essentially of 100 parts of xylene, between about 15 and about 35 parts of di-isobutyl ketone, between about 40 and about 60 parts of methyl ethyl ketone and between about 15 and about 30 parts of isobutanol.

18. A novel composition consisting essentially of between about 1 and about 50 weight percent of a non-volatile phase consisting essentially of an admixture of 100 parts of a normally solid homopolymer of trifluorochloroethylene having a no strength temperature of at least 220° C., between about 5 and about 100 parts of the allylated ether of trimethylol phenol, between about 20 and about 200 parts of the condensation product of epichlorohydrin and p,p'-dihydroxy diphenyl dimethyl methane, said condensation product having an epoxy equivalent between about 190 and about 4,000 and between about 1 and about 25 parts of a telomer of trifluorochloroethylene having a boiling point between about 95° C. and about 270° C. at 0.5 mm. of mercury and as the volatile vehicle between about 1 and about 50 weight percent of at least one compound selected from the group consisting of alcohols, aromatic and aliphatic ketones and aromatic hydrocarbons.

19. A novel composition consisting essentially of between about 1 and about 50 weight percent of a non-volatile phase consisting essentially of an admixture of 100 parts of a normally solid homopolymer of trifluorochloroethylene having a no strength temperature of at least 220° C., between about 5 and about 100 parts of the allylated ether of trimethylol phenol, between about 20 and about 200 parts of the condensation product of epichlorohydrin and p,p'-dihydroxy diphenyl dimethyl methane, said condensation product having an epoxy equivalent between about 190 and about 4,000 and between about 1 and about 25 parts of an elastomeric copolymer containing between about 20 and about 69 mole percent of trifluorochloroethylene copolymerized with vinylidene fluoride and as the volatile vehicle between about 1 and about 50 weight percent of at least one compound selected from the group consisting of alcohols, aromatic and aliphatic ketones and aromatic hydrocarbons.

20. An article of manufacture which comprises a substrate, an intermediate adhesive layer comprising an admixture of 100 parts of a normally solid polymer of trifluorochloroethylene having a softening point above about 150° C. and between about 5 and about 100 parts of a methylol phenol and an outer protective layer comprising a normally solid polymer of trifluorochloroethylene having a softening point above about 150° C.

21. The article of claim 20 in which the substrate is a metal.

22. The article of claim 21 in which the metal is steel.

23. An article of manufacture which comprises a substrate, an intermediate adhesive layer comprising an admixture comprising 100 parts of a normally solid polymer of trifluorochloroethylene having a softening point above about 150° C., between about 5 and about 100 parts of a methylol phenol and between about 20 and about 200 parts of the condensation product of epichlorohydrin and p,p'-dihydroxy diphenyl dimethyl methane, said condensation product having an epoxy equivalent between about 190 and about 4,000 and an outer protective layer comprising a normally solid polymer of trifluorochloroethylene having a softening point above about 150° C.

24. A process which comprises applying to a substrate which withstands the heating temperature specified below an admixture of 100 parts of a normally solid polymer of trifluorochloroethylene having a softening point above about 150° C. and between about 5 and about 100 parts of a methylol phenol and heating said admixture above the first order transition temperature of said polymer of trifluorochloroethylene and below the decomposition temperature of said admixture.

25. A process which comprises applying to a substrate which withstands the heating temperature specified below an intermediate adhesive layer of an admixture of between about 1 and about 50 weight percent of a non-volatile phase comprising 100 parts of a normally solid homopolymer of trifluorochloroethylene having a no strength temperature of at least 220° C., between about 5 and about 100 parts of the allylated ether of trimethylol phenol, between about 20 and about 200 parts of condensation product of epichlorohydrin and p,p'dehydroxy diphenyl dimethyl methane, said condensation product having an epoxy equivalent between about 190 and about 4,000 and between about 1 and about 50 weight percent of a volatile vehicle comprising at least one compound selected from the group consisting of alcohols, aromatic and aliphatic ketones, and aromatic hydrocarbons, evaporating said volatile vehicle and baking said non-volatile phase at a temperature between about 420° F. and about 520° F., applying an outer protective coating of a homopolymer of trifluorochloroethylene dispersed in a volatile vehicle selected from the group consisting of aromatic and aliphatic ketones and aromatic hydrocarbons heating said protective coating at a temperature between about 420° F. and about 520° F.

26. The process of claim 25 in which the non-volatile phase contains between about 0.1 and about 3 parts of phosphoric acid.

References Cited in the file of this patent
UNITED STATES PATENTS
2,497,046     Kropa _____ Feb. 7, 1950